(12) United States Patent
Hayashi

(10) Patent No.: US 9,464,157 B2
(45) Date of Patent: Oct. 11, 2016

(54) POLYURETHANE FOAM

(71) Applicant: SMP Technologies Inc., Tokyo (JP)

(72) Inventor: Shunichi Hayashi, Tokyo (JP)

(73) Assignee: SMP Technologies Inc., Tokyo (JP)

(*) Notice: Subject to any disclaimer, the term of this patent is extended or adjusted under 35 U.S.C. 154(b) by 135 days.

(21) Appl. No.: 14/127,091

(22) PCT Filed: Dec. 28, 2012

(86) PCT No.: PCT/JP2012/084209
§ 371 (c)(1),
(2) Date: Dec. 17, 2013

(87) PCT Pub. No.: WO2013/108582
PCT Pub. Date: Jul. 25, 2013

(65) Prior Publication Data
US 2014/0128491 A1    May 8, 2014

(30) Foreign Application Priority Data

Jan. 17, 2012 (JP) ................................. 2012-007114

(51) Int. Cl.
| | |
|---|---|
| *C08G 18/48* | (2006.01) |
| *C08G 18/76* | (2006.01) |
| *C08G 18/18* | (2006.01) |
| *C08G 18/22* | (2006.01) |
| *C08G 101/00* | (2006.01) |

(52) U.S. Cl.
CPC ........... *C08G 18/4829* (2013.01); *C08G 18/18* (2013.01); *C08G 18/22* (2013.01); *C08G 18/4812* (2013.01); *C08G 18/4825* (2013.01); *C08G 18/7621* (2013.01); *C08G 2101/0008* (2013.01); *C08G 2101/0083* (2013.01); *C08G 2280/00* (2013.01); *C08G 2350/00* (2013.01)

(58) Field of Classification Search
CPC .......... C08G 18/4812; C08G 18/7621; C08G 18/404; C08G 18/4808
See application file for complete search history.

(56) References Cited

U.S. PATENT DOCUMENTS

| | | | | |
|---|---|---|---|---|
| 5,683,955 | A | * | 11/1997 | Hiroi et al. ................... 503/227 |
| 2005/0038131 | A1 | | 2/2005 | Narishima et al. |
| 2010/0291835 | A1 | | 11/2010 | Omoto et al. |
| 2012/0313421 | A1 | | 12/2012 | Kondo |

FOREIGN PATENT DOCUMENTS

| | | | |
|---|---|---|---|
| JP | 2000-212241 | A | 8/2000 |
| JP | 2003-306622 | A | 10/2003 |
| JP | 2004-161987 | A | 6/2004 |
| JP | 2005-60552 | A | 3/2005 |
| JP | 2005-195881 | A | 7/2005 |
| JP | 2009-35697 | A | 2/2009 |
| JP | 2011-189121 | A | 9/2011 |
| JP | 2012-45104 | A | 3/2012 |

* cited by examiner

*Primary Examiner* — Peter F Godenschwager
(74) *Attorney, Agent, or Firm* — Muncy, Geissler, Olds & Lowe, P.C.

(57) ABSTRACT

A polyurethane foam having excellent shape-following properties, which exhibits favorable comfort when worn on the human body, both during movement and at rest. The polyurethane foam contains a toluene diisocyanate and a polyether polyol as the main components, has a glass transition temperature, defined as the temperature corresponding with the peak value of the loss tangent, of not less than 0° C. and not more than 40° C., and in the temperature range from not less than 0° C. to not more than 40° C., the loss tangent in the frequency range from not less than 0.1 Hz to not more than 100 Hz is 0.4 or greater, and the average value of the loss tangent in the frequency range from not less than 0.1 Hz to not more than 1 Hz is not greater than the average value of the loss tangent in the frequency range from not less than 10 Hz to not more than 100 Hz.

16 Claims, 4 Drawing Sheets

POLYURETHANE FOAM

This application is a national stage of International Application No.: PCT/JP2012/084209, which was filed on Dec. 28, 2012, and which claims priority to Japanese Patent Application No.: 2012-007114, which was filed in Japan on Jan. 17, 2012, and which are both herein incorporated by reference.

TECHNICAL FIELD

The present invention relates to a polyurethane foam having shape-following properties that deforms and follows the shape of a contacted item. In particular, the present invention relates to a polyurethane foam which is worn on the human body, and deforms to follow shape changes that accompany movement of the body.

BACKGROUND ART

Among polyurethane foams, shape memory polyurethane foams and low repulsion polyurethane foams are already known. However, the dynamic viscoelasticity of these polyurethane foams when worn on the human body had previously not been investigated. When worn on the human body, the energy absorption capability of these foams is poor, and they suffered from poor wearable comfort.

In contrast, Patent Literature 1 (PTL 1) discloses a resin foam having good shape-following properties, which undergoes a reduction in hardness upon heat transfer from the human body, enabling the foam to deform and follow the shape of the surface of the body. The resin foam of PTL 1 is composed, for example, of a polyurethane foam, which has a glass transition point of 10 to 35° C. (namely, in the vicinity of the body surface temperature), and exhibits a loss tangent tan δ within this temperature range of 0.20 to 0.80.

CITATION LIST

Patent Literature

{PTL 1} Japanese Unexamined Patent Application, Publication No. 2009-35697

SUMMARY OF INVENTION

Technical Problem

Paragraph [0038] of PTL 1 discloses that the storage elastic modulus and the loss elastic modulus of the polyurethane foam are measured at a frequency of 1 Hz, and the value of tan δ is then calculated. A frequency of 1 Hz is equivalent to the dynamic viscoelasticity of the surface of the human body at rest. Accordingly, it can be stated that the foam disclosed in PTL 1 exhibits excellent shape-following properties for a body at rest. However, absolutely no comment is made regarding the shape-following properties of the foam upon movement (near 100 Hz). Because the foam of PTL 1 exhibits the same softness during movement as that observed at rest, ensuring favorable wearability and comfort during movement has proven difficult.

An object of the present invention is to provide a polyurethane foam having excellent shape-following properties, which exhibits favorable comfort when worn on the human body, both during movement and at rest.

Solution to Problem

In order to achieve the above object, the present invention provides a polyurethane foam comprising a toluene diisocyanate and a polyether polyol as the main components, wherein the polyurethane foam has a glass transition temperature, defined as the temperature corresponding with the peak value of the loss tangent, of not less than 0° C. and not more than 40° C., and in the temperature range from not less than 0° C. to not more than 40° C., the loss tangent in the frequency range from not less than 0.1 Hz to not more than 100 Hz is 0.4 or greater, and the average value of the loss tangent in the frequency range from not less than 0.1 Hz to not more than 1 Hz is not greater than the average value of the loss tangent in the frequency range from not less than 10 Hz to not more than 100 Hz.

In the invention described above, the percentage change in the average value of the loss tangent in the frequency range from not less than 10 Hz to not more than 100 Hz relative to the average value of the loss tangent in the frequency range from not less than 0.1 Hz to not more than 1 Hz is preferably not less than 0% and not more than 10%.

In the invention described above, the polyether polyol and the toluene diisocyanate are preferably blended in a ratio (mass ratio) within a range from 100:39 to 100:47.5.

In the invention described above, the the toluene diisocyanate is preferably a mixture of 2,4-toluene diisocyanate and 2,6-toluene diisocyanate in a ratio of 65:35 to 80:20.

In the invention described above, the polyether polyol is preferably a polyoxypropylene triol having a molecular weight of not less than 700 and not more than 3,000, a polyoxypropylene diol having a molecular weight of not less than 400 and not more than 2,000, or a mixture of the polyoxypropylene triol and the polyoxypropylene diol.

The polyurethane foam of the present invention has a glass transition temperature similar to the temperature of the surface of the human body. As a result, when the polyurethane foam of the present invention is worn on the surface of the human body, the foam undergoes a decrease in hardness and softens, and the portions in contact with the body deform and follow the shape of the body surface.

Further, the polyurethane foam of the present invention has a high loss tangent across the frequency range from the frequency of the surface of the human body at rest (0.1 to 1 Hz) to the frequency of the surface of the human body during movement (10 to 100 Hz). Furthermore, the average value of the loss tangent at the frequency at rest is not greater than the average value of the loss tangent at the frequency during movement. As a result, when the polyurethane foam of the present invention is worn on the human body, it exhibits softness at rest, but then functions as a spring during movement, absorbing impact. Accordingly, the polyurethane foam of the present invention fits favorably to the human body at rest, and also exhibits excellent wearability and support during movement. Polyurethane foams for which the percentage change in the average value of the loss tangent at the frequency observed during movement relative to the average value of the loss tangent at the frequency observed at rest is not less than 0% and not more than 10% can provide a particularly superior feeling of wearability for the wearer, both at rest and during movement.

Advantageous Effects of Invention

The polyurethane foam of the present invention combines the stiffness required during movement with the softness required at rest, and also exhibits superior energy absorption. Accordingly, the foam exhibits good comfort, while achieving the wearability and support required during movement.

DESCRIPTION OF EMBODIMENTS

Figure 1:
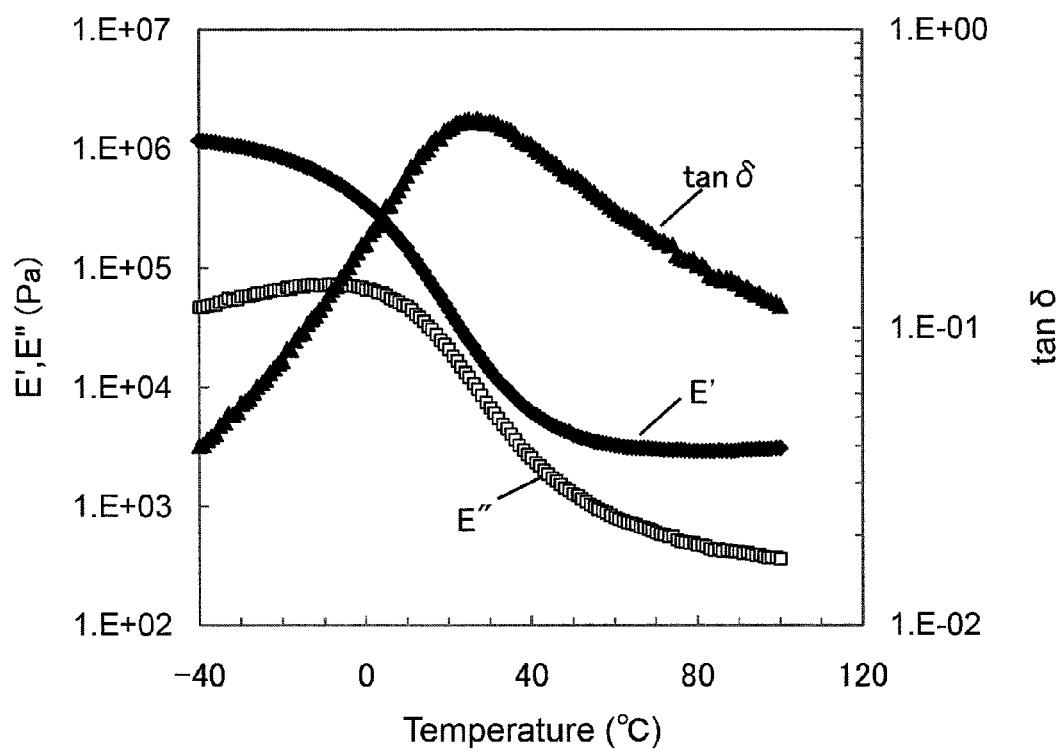
FIG. 1 A graph illustrating the temperature dependence of the dynamic viscoelasticity of a polyurethane foam of Example 1.

A polyurethane foam of the present embodiment is produced by foaming and curing a foam raw material comprising a toluene diisocyanate and a polyether polyol as the main components.

The toluene diisocyanate (TDI) is a mixture of 2,4-toluene diisocyanate and 2,6-toluene diisocyanate. The mixing ratio (mass ratio) of 2,4-toluene diisocyanate:2,6-toluene diisocyanate is set within a range from 65:35 to 80:20.

The polyether polyol is a polyoxypropylene triol, a polyoxypropylene diol, or a mixture of a polyoxypropylene triol and a polyoxypropylene diol.

The polyoxypropylene triol used in the present embodiment has a molecular weight of not less than 700 and not more than 3,000. A single polyoxypropylene triol having a molecular weight within this range may be used alone, or a plurality of polyoxypropylene triols having different molecular weights may be used as a mixture.

The polyoxypropylene diol used in the present embodiment has a molecular weight of not less than 400 and not more than 2,000. A single polyoxypropylene diol having a molecular weight within this range may be used alone, or a plurality of polyoxypropylene diols having different molecular weights may be used as a mixture.

In the present embodiment, the mixing ratio between the polyether polyol and the TDI is preferably set within a range from polyether polyol: TDI=100:39.21 to 100:47.5 (mass ratio). If the amount of the TDI is less than the above range, then the foam becomes too soft. As a result, the strength and elastic modulus (Young's modulus) of the foam tend to decrease. Further, if the amount of the TDI is greater than the above range, then the hardness of the foam increases. As the hardness increases, the elongation of the foam tends to deteriorate, and the elastic modulus decreases.

The foam raw material of the present embodiment also comprises a catalyst for polymerizing the TDI and the polyether polyol. For example, amine-based catalysts and metal catalysts can be used as the catalyst. Examples of the amine-based catalysts include triethylenediamine, tetramethylguanidine and N,N,N',N'-tetramethylhexane-1,6-diamine. Examples of the metal catalysts include dibutyltin dilaurate, potassium octanoate, lead naphthenate and zinc neodecanoate. The catalyst may be a single compound selected from among the above catalysts, or a mixture of two or more catalysts may be used. The amount added of the catalyst is within a range from 0.1 to 2% by mass relative to the total mass of the polyether polyol.

The foam raw material of the present embodiment comprises a foaming agent. There are no particular limitations on the foaming agent, provided it is able to cause foaming of the reaction product of the TDI and the polyether polyol. Specific examples of foaming agents that can be used include water, halogenated aliphatic hydrocarbons (such as methylene chloride and trichloroethane), carbon dioxide, inorganic foaming agents (such as heavy sodium carbonate, ammonium carbonate, heavy ammonium carbonate, ammonium nitrite and azide compounds), and organic foaming agents (such as azodicarbonamide, azobisformamide and N,N-dinitrosopentamethylenetetramine). Water is particularly preferable. The foaming agent may be a single compound selected from among the above foaming agents, or a mixture of two or more foaming agents may be used. The amount added of the foaming agent is preferably within a range from 0.5 to 5% by mass relative to the total mass of the polyether polyol.

The foam raw material of the present embodiment may also comprise a foam stabilizer. The foam stabilizer is added to stabilize the uniformly dispersed fine gas bubbles. The use of a silicone-based foam stabilizer is preferable. Examples of silicone-based foam stabilizers include block copolymers of a dimethylpolysiloxane and a polyether, and compounds obtained by adding organic functional groups to a polysiloxane. A single foam stabilizer may be used alone, or a mixture of two or more foam stabilizers may be used. The amount added of the foam stabilizer is preferably within a range from 0.5 to 3% by mass relative to the total mass of the polyether polyol.

The foam raw material of the present embodiment may also comprise stabilizers, antioxidants and ultraviolet stabilizers and the like.

The polyurethane foam of the present embodiment has a glass transition temperature Tg of not less than 0° C. and not more than 40° C. The glass transition temperature is defined as the temperature corresponding with the peak value of the loss tangent (tan $\delta$). Further, tan $\delta$ is defined as the ratio (E"/E') of the loss elastic modulus E" relative to the storage elastic modulus E'. In other words, tan $\delta$ indicates the energy absorption capability.

The temperature of the surface of the human body is typically 28 to 30° C. As a result, when the polyurethane foam of the present embodiment is worn on the surface of the human body, the polyurethane foam undergoes a decrease in hardness and softens, and the portions in contact with the body deform and follow the shape of the body surface.

At temperatures of not less than 0° C. and not more than 40° C., the polyurethane foam of the present embodiment has a tan $\delta$ value of 0.4 or greater in the frequency range from 0.1 Hz to 100 Hz. Further, for the polyurethane foam of the present embodiment, the average value A of tan $\delta$ in the frequency range from not less than 0.1 Hz to not more than 1 Hz is not greater than the average value B of tan $\delta$ in the frequency range from not less than 10 Hz to not more than 100 Hz (namely, A≤B).

For the polyurethane of the present embodiment, the value of tan $\delta$ in the frequency range from not less than 0.1 Hz to not more than 100 Hz is preferably constant for temperatures of not less than 0° C. and not more than 40° C. Here, the expression that tan $\delta$ is "constant" means that the percentage change in the average value B of tan $\delta$ relative to the average value A of tan $\delta$ (namely, (B−A)/A (%)) is preferably not less than 0% and not more than 10%. This percentage change in tan $\delta$ is more preferably not less than 0% and not more than 2.5%.

The frequency of the surface of the human body at rest is equivalent to a frequency of 0.1 to 1 Hz. In contrast, the frequency of the surface of the human body during movement is equivalent to a frequency of 10 to 100 Hz.

When a polyurethane foam having the properties described above is worn on the human body, when the wearer is in a state of rest, the wearer feels no sense of discomfort associated with the decrease in the hardness of the polyurethane foam or the shape-following properties of the polyurethane foam, and a feeling of a favorable fit to the body is obtained.

On the other hand, when the wearer is in a state of movement, the polyurethane foam absorbs any impact from the movement, and therefore supports the shape of the body surface at the portions of contact.

Moreover, if the value of tan δ is constant (with a percentage change of not less than 0% and not more than 10%) across the frequencies during movement and the frequencies when at rest, then the wearer feels that the polyurethane foam fits favorably to the body even during movement. As a result, the foam exhibits good wearability both during movement and when at rest. In particular, if the percentage change in tan δ is not less than 0% and not more than 2.5%, then the wearer senses an excellent feeling of wearability both during movement and when at rest.

Further, at temperatures of not less than 0° C. and not more than 40° C., the value of E' for the polyurethane foam of the present embodiment tends to increase with increasing frequency in the frequency range from 0.1 Hz to 100 Hz. As a result, when the wearer is in a state of rest, the wearer feels that the polyurethane foam is soft. On the other hand, when the wearer is in a state of movement, the polyurethane foam assists the movement of the muscles and supports the shape of body fat. Accordingly, the polyurethane foam of the present embodiment provides a favorable sensation of wearability, both during movement and when at rest.

The polyurethane foam of the present embodiment is produced via the steps described below.

First, predetermined amounts of the polyoxypropylene triol and the polyoxypropylene diol are weighed. Additives other than the catalyst (such as the foaming agent, foam stabilizer, stabilizers, antioxidants and ultraviolet stabilizers) are added to the polyoxypropylene triol and polyoxypropylene diol, and the resulting mixture is stirred and mixed at room temperature.

Predetermined amounts of the TDI and the catalyst are then weighed. The TDI and the catalyst are added to the mixed polyoxypropylene triol and polyoxypropylene diol, and stirring and mixing are performed at room temperature to complete preparation of the foam raw material.

The foam raw material is placed in a container having a predetermined shape, and the foam raw material is then subjected to natural foaming inside the container. Following completion of the foaming, the container is placed inside a curing oven filled with steam, and a heat treatment is performed. The conditions for the heat treatment include a temperature of 60 to 90° C. and a heating time of 30 minutes to 12 hours. The conditions for the heat treatment are adjusted appropriately within the above ranges, depending on the composition and the like of the foam raw material, so as to achieve a foam that satisfies the glass transition temperature and tan δ frequency dependence described above. Further, the conditions of the heat treatment may also be set appropriately with due consideration of the hardness, density, strength, elongation and resistance to discoloration of the foam, and the uniformity of these properties throughout the entire foam.

EXAMPLES

The polyurethane foam of the present invention is described below using a series of examples.

The compositions of the polyurethane foams of the examples and comparative examples are shown in Table 1. Each of these compositions is shown in terms of mass %.

The polyol A shown in the table is a polyoxypropylene triol having a molecular weight of 700 (T-700, manufactured by Mitsui Chemicals, Inc.). The polyol B is a polyoxypropylene diol having a molecular weight of 700 (D-700, manufactured by Mitsui Chemicals, Inc.). The polyol C is a polyoxypropylene triol having a molecular weight of 3,000 (T-3000, manufactured by Mitsui Chemicals, Inc.). The polyol D is a polyoxypropylene diol having a molecular weight of 2,000 (D-2000, manufactured by Mitsui Chemicals, Inc.). The polyol E is a polyoxypropylene diol having a molecular weight of 1,000 (D-1000, manufactured by Mitsui Chemicals, Inc.). The polyol F is a polyoxypropylene diol having a molecular weight of 400 (D-400, manufactured by Mitsui Chemicals, Inc.).

In the examples and comparative examples, a toluene diisocyanate composed of 2,4-toluene diisocyanate: 2,6-toluene diisocyanate=65:35 (TDI, manufactured by Mitsui Chemicals, Inc.) was used.

Water was used as the foaming agent. An amine-based catalyst (33LV, manufactured by Chukyo Yushi Co., Ltd.) was used as the catalyst. In Example 2, a metal-based catalyst (T-9, manufactured by Air Products and Chemicals, Inc.) was also used in addition to the above catalyst. A silicone-based foam stabilizer (L-626, manufactured by GE Toshiba Silicones Co., Ltd.) was used as the foam stabilizer.

In Table 1, the amounts added of the above foaming agent, catalyst and foam stabilizer are shown relative to a value of 100 for the combination of the toluene diisocyanate and the polyols.

TABLE 1

|  | Example 1 | Example 2 | Example 3 | Example 4 | Example 5 | Example 6 | Comparative Example 1 | Comparative Example 2 | Comparative Example 3 |
| --- | --- | --- | --- | --- | --- | --- | --- | --- | --- |
| Polyol A | 35 | 35 |  |  | 100 | 30 | 50 | 70 | 35 |
| Polyol B | 15 | 35 | 45 | 80 |  |  | 50 |  | 35 |
| Polyol C | 20 | 20 | 40 | 20 |  | 50 |  | 20 | 10 |
| Polyol D | 10 |  |  |  |  | 10 |  | 10 |  |
| Polyol E | 14.3 |  | 15 |  |  |  |  |  | 10 |
| Polyol F | 5.7 |  |  |  |  |  |  |  | 10 |
| Toluene diisocyanate | 44.9 | 44.8 | 45.3 | 47.5 | 39 | 39.7 | 48 | 50.8 | 48.8 |
| Foaming agent | 2.1 | 2.1 | 2.1 | 2.1 | 3 | 2.1 | 3 | 2.1 | 2.1 |
| Catalyst | 0.1 | 0.1 | 0.1 | 0.1 | 0.1 | 0.1 | 0.1 | 0.1 | 0.1 |
| Foam stabilizer | 0.7 | 0.7 | 0.7 | 0.7 | 0.7 | 0.7 | 0.7 | 0.7 | 0.7 |

Foam raw materials were prepared with the compositions shown in Table 1, and each foam raw material was then placed in a container (100 cm×100 cm×100 cm), and subjected to natural foaming for 15 minutes inside the container. Subsequently, the composition was subjected to a heat treatment and curing in a curing oven under conditions including a temperature of 80° C. and a heating time of one hour. Strip-shaped samples having dimensions of length 30 mm×width 10 mm×thickness 5 mm were cut from each of the polyurethane foams.

The dynamic viscoelasticity of the polyurethane foams of the examples and comparative examples was measured.

(1) Measurement of Temperature Dependence of Dynamic Viscoelasticity

Using a viscoelasticity measurement apparatus (DVE-V4, manufactured by Rheology Co., Ltd.), the storage elastic modulus E' and the loss elastic modulus E" of each sample were measured while the measurement temperature was changed. The measurement conditions included a tensile measurement mode, a displacement amplitude of 20 μm, a frequency of 1 Hz, a measurement temperature range of −40° C. to 130° C., and a rate of temperature increase of 2° C./minute.

(2) Measurement of Frequency Dependence of Dynamic Viscoelasticity

Using the same apparatus as that used in (1), the storage elastic modulus E' and the loss elastic modulus E" of each sample were measured while the measurement frequency was changed. The measurement conditions included a tensile measurement mode, a displacement amplitude of 20 μm, a measurement temperature of 25° C., and a measurement frequency range of 0.5 Hz to 300 Hz.

The loss tangent tan δ was obtained from the storage elastic modulus E' and the loss elastic modulus E". In each of the examples and comparative examples, the change in tan δ relative to the temperature was graphed, and the temperature within the measurement temperature range where tan δ reached a maximum was recorded as the glass transition temperature Tg.

The loss tangent tan δ was obtained from the storage elastic modulus E' and the loss elastic modulus E". In each of the examples and comparative examples, the percentage change in the average value B of tan δ relative to the average value A of tan δ (namely, the change in tan δ) was determined.

Table 2 shows the glass transition temperature and the change in tan δ for each of the examples and comparative examples.

Figure 2:
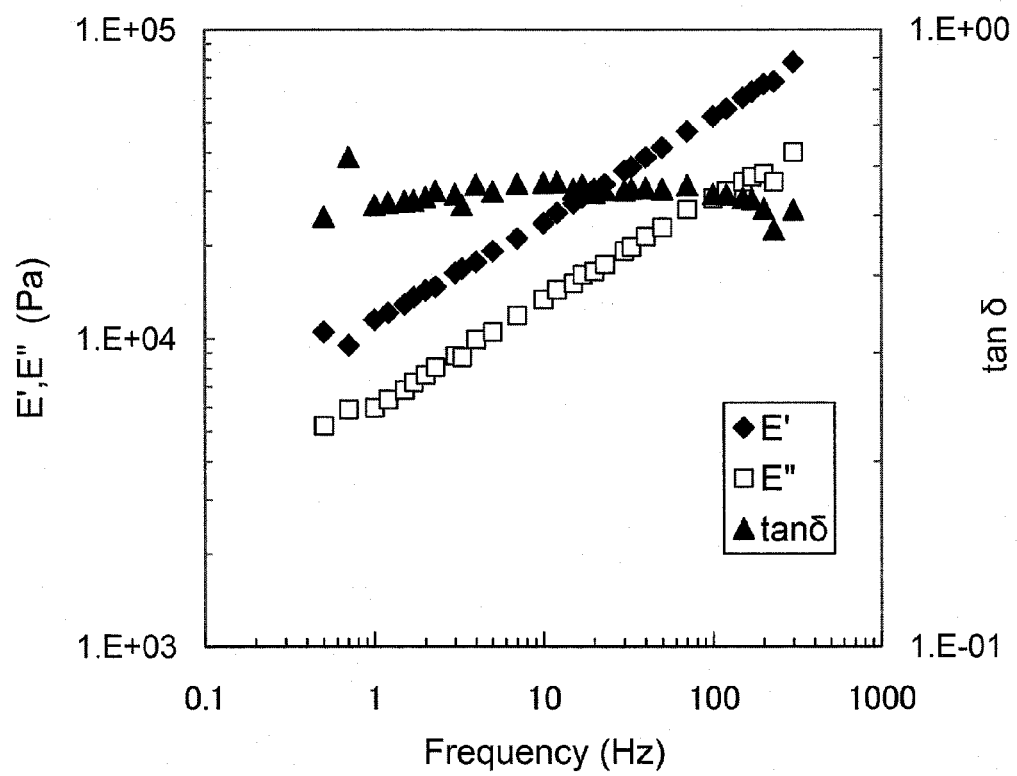
FIG. 2 A graph illustrating the frequency dependence of the dynamic viscoelasticity of the polyurethane foam of Example 1.

FIG. 2 shows the results of Example 1, as one example of a graph illustrating the frequency dependence of the dynamic viscoelasticity. In this figure, the horizontal axis represents the frequency, the first vertical axis represents E' and E", and the second vertical axis represents tan δ.

Figure 3:
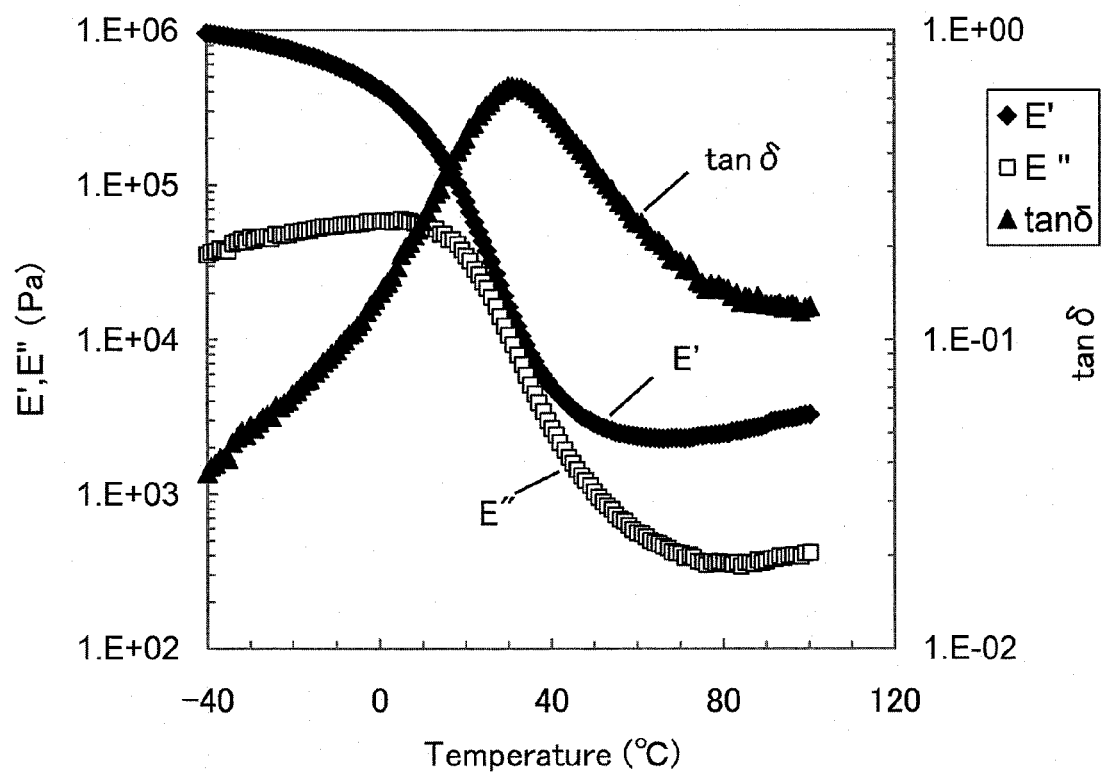
FIG. 3 A graph illustrating the temperature dependence of the dynamic viscoelasticity of a polyurethane foam of Comparative Example 3.
Figure 4:
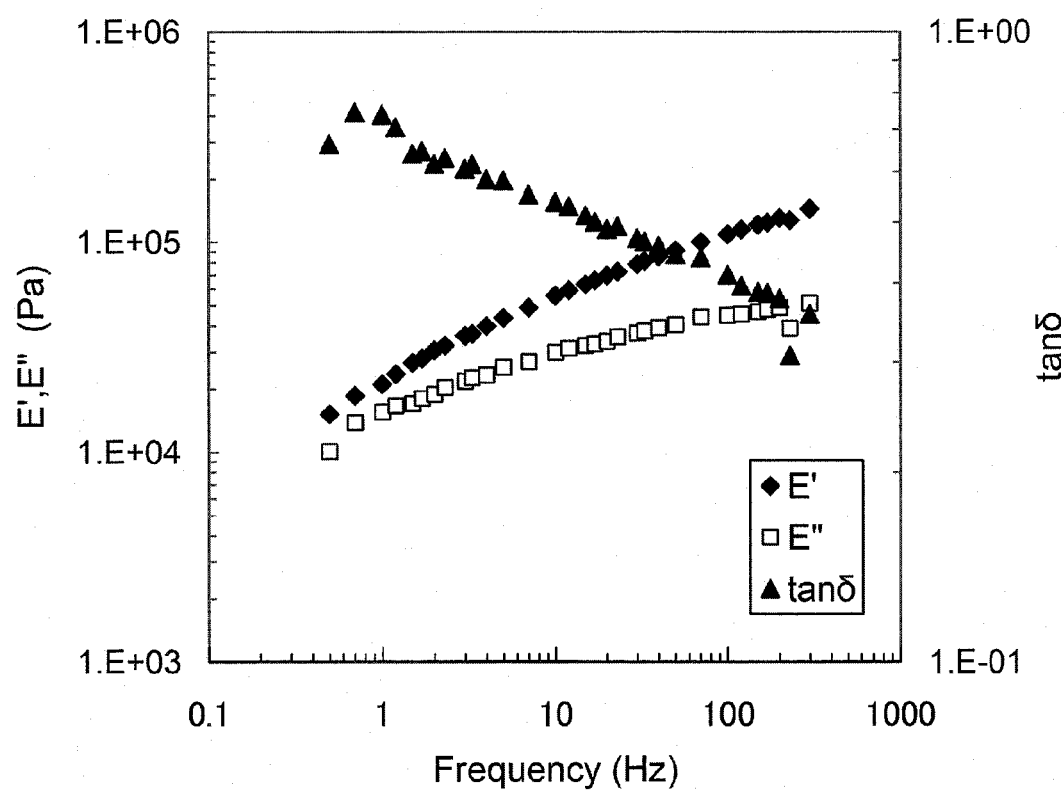
FIG. 4 A graph illustrating the frequency dependence of the dynamic viscoelasticity of the polyurethane foam of Comparative Example 3.

FIG. 3 shows a graph illustrating the temperature dependence of the dynamic viscoelasticity for Comparative Example 3. In this figure, the horizontal axis represents the temperature, the first vertical axis represents E' and E", and the second vertical axis represents tan δ. FIG. 4 shows a graph illustrating the frequency dependence of the dynamic viscoelasticity for Comparative Example 3. In this figure, the horizontal axis represents the frequency, the first vertical axis represents E' and E", and the second vertical axis represents tan δ. The polyurethane foam of Comparative Example 3 was prepared under the same conditions as the foam of Example 1.

Referring to FIG. 1 and FIG. 3, it is evident that the temperature dependence of the dynamic viscoelasticity is similar in Example 1 and Comparative Example 3. The glass transition temperatures were also similar. In other words, both Example 1 and Comparative Example 3 exhibited a glass transition temperature within a range from 0° C. to 40° C.

Examples 2 to 6 and Comparative Examples 1 and 2 all exhibited glass transition temperatures within the range from 0° C. to 40° C.

Referring to FIG. 2 and FIG. 4, it is evident that in the polyurethane foams of Example 1 and Comparative Example 3, E' increases as the frequency increases. However, comparing E' with E", whereas E' and E" increase at substantially the same rate in Example 1, the rate of increase of E' is larger than that of E" in Comparative Example 3.

In both Example 1 and Comparative Example 3, the value of tan δ was 0.4 or greater in the frequency range from 0.1 Hz to 100 Hz.

However, in Example 1, tan δ during movement (10 to 100 Hz) was greater than tan δ at rest (0.1 to 1 Hz). Moreover, as illustrated in FIG. 2, tan δ is substantially constant from 0.1 to 100 Hz. Reference to Table 2 reveals that the change in tan δ in Example 1 was an extremely low 1.4%. In contrast, in Comparative Example 3, tan δ tended to decrease with increasing frequency, and tan δ during movement was lower than tan δ at rest. Reference to Table 2 reveals that the change in tan δ in Comparative Example 3 was −33.2%.

The polyurethane foams of Examples 2 to 6 all exhibited a value of tan δ of 0.4 or greater in the frequency range from 0.1 Hz to 100 Hz. As shown in Table 2, the change in tan δ was positive for each of Examples 2 to 6, indicating that tan

TABLE 2

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Tg | 8.5 | 7 | 5 | 9.5 | 35.5 | 3.5 | 30 | 123 | 10.5 |
| Change in tan δ (%) | 1.4 | 2.4 | 7.1 | 9.8 | 23.1 | 14.6 | −22.8 | −10.5 | −33.2 |

FIG. 1 shows the results of Example 1, as one example of a graph illustrating the temperature dependence of the dynamic viscoelasticity. In this figure, the horizontal axis represents the temperature, the first vertical axis represents E' and E", and the second vertical axis represents tan δ.

δ during movement was greater than tan δ at rest. In Examples 3 and 4, this change was not more than 10%. In particular, in Example 2, the change was a low 2.4%.

In contrast, in the polyurethane foams of Comparative Examples 1 and 2, the change in tan δ across the frequency range from 0.1 to 100 Hz was negative. In other words, tan δ during movement was lower than tan δ at rest.

As described above, the polyurethane foams of the examples each had a glass transition temperature close to the temperature of the surface of the human body, exhibited a value of tan δ that was 0.4 or greater across the frequency range from 0.1 Hz to 100 Hz, and exhibited a positive change in tan δ. As a result, when the polyurethane foams of the examples were worn on the human body, they provided a favorable feeling of wearability for the wearer, both during movement and at rest. Examples 3 and 4 exhibited a better feeling of wearability than Examples 5 and 6, and Examples 1 and 2 displayed a particularly superior feeling of wearability.

The invention claimed is:

1. A polyurethane foam formed from a reaction mixture comprising a toluene diisocyanate and a polyether polyol mixture as main components,
   wherein the polyurethane foam has a glass transition temperature, defined as a temperature corresponding with a peak value of a loss tangent, of not less than 0° C. and not more than 40° C.,
   wherein in a temperature range from not less than 0° C. to not more than 40° C., the loss tangent in a frequency range from not less than 0.1 Hz to not more than 100 Hz is 0.4 or greater,
   wherein an average value of the loss tangent in a frequency range from not less than 0.1 Hz to not more than 1 Hz is not greater than an average value of the loss tangent in a frequency range from not less than 10 Hz to not more than 100 Hz,
   wherein a percentage change in the average value of the loss tangent in the frequency range from not less than 10 Hz to not more than 100 Hz relative to the average value of the loss tangent in the frequency range from not less than 0.1 Hz to not more than 1 Hz is not less than 0% and not more than 2.4%, and
   wherein the polyether polyol mixture comprises at least two polyoxypropylene triols having a molecular weight of not less than 700 and not more than 3,000, and at least two polyoxypropylene diols having a molecular weight of not less than 400 and not more than 2,000.

2. The polyurethane foam according to claim 1, wherein the percentage change in the average value of the loss tangent in the frequency range from not less than 10 Hz to not more than 100 Hz relative to the average value of the loss tangent in the frequency range from not less than 0.1 Hz to not more than 1 Hz is not less than 1.4% and not more than 2.4%.

3. The polyurethane foam according to claim 1, wherein the polyether polyol mixture and the toluene diisocyanate are blended in a mass ratio within a range from 100:39 to 100:47.5.

4. The polyurethane foam according to claim 1, wherein the toluene diisocyanate is a mixture of 2,4-toluene diisocyanate and 2,6-toluene diisocyanate in a ratio of 65:35 to 80:20.

5. The polyurethane foam according to claim 1, wherein the polyether polyol mixture comprises a polyoxypropylene diol having a molecular weight of 700.

6. The polyurethane foam according to claim 5, wherein the polyether polyol mixture comprises 15 to 35% weight percent of a polyoxypropylene diol having a molecular weight of 700.

7. The polyurethane foam according to claim 1, wherein the polyether polyol mixture comprises a polyoxypropylene diol having a molecular weight of 2000.

8. The polyurethane foam according to claim 7, wherein the polyether polyol mixture comprises 10% weight percent of a polyoxypropylene diol having a molecular weight of 2,000.

9. The polyurethane foam according to claim 1, wherein the polyether polyol mixture comprises a polyoxypropylene triol having a molecular weight of 700.

10. The polyurethane foam according to claim 9, wherein the polyether polyol mixture comprises 35% weight percent of a polyoxypropylene triol having a molecular weight of 700.

11. The polyurethane foam according to claim 1, wherein the polyether polyol mixture comprises a polyoxypropylene triol having a molecular weight of 3000.

12. The polyurethane foam according to claim 11, wherein the polyether polyol mixture comprises 20% weight percent of a polyoxypropylene triol having a molecular weight of 3,000.

13. The polyurethane foam according to claim 1, wherein the polyether polyol mixture comprises a polyoxypropylene diol having a molecular weight of 400.

14. The polyurethane foam according to claim 13, wherein the polyether polyol mixture comprises 5.7% weight percent of a polyoxypropylene diol having a molecular weight of 400.

15. The polyurethane foam according to claim 1, wherein the polyether polyol mixture comprises a polyoxypropylene diol having a molecular weight of 1,000.

16. The polyurethane foam according to claim 15, wherein the polyether polyol mixture comprises 14.3% weight percent of a polyoxypropylene diol having a molecular weight of 1,000.

* * * * *